US009809339B2

(12) United States Patent
May et al.

(10) Patent No.: US 9,809,339 B2
(45) Date of Patent: Nov. 7, 2017

(54) SPOOL MOUNT ASSEMBLIES FOR ROTATING MULTI-CLIPPER PLATFORM SYSTEMS

(71) Applicant: Tipper Tie, Inc., Apex, NC (US)

(72) Inventors: Dennis J. May, Pittsboro, NC (US); Samuel D. Griggs, Raleigh, NC (US); Kuo-Raid Grant Chen, Cary, NC (US)

(73) Assignee: Tipper Tie, Inc., Apex, NC (US)

( * ) Notice: Subject to any disclaimer, the term of this patent is extended or adjusted under 35 U.S.C. 154(b) by 529 days.

(21) Appl. No.: 14/445,488

(22) Filed: Jul. 29, 2014

(65) Prior Publication Data

US 2015/0040519 A1   Feb. 12, 2015

Related U.S. Application Data

(60) Provisional application No. 61/864,000, filed on Aug. 9, 2013.

(51) Int. Cl.
*B65B 51/04* (2006.01)
*B65H 16/06* (2006.01)
*A22C 11/12* (2006.01)

(52) U.S. Cl.
CPC ............ *B65B 51/04* (2013.01); *A22C 11/125* (2013.01); *B65H 16/06* (2013.01); *Y10T 29/4984* (2015.01)

(58) Field of Classification Search
CPC ....... B65B 51/00; B65B 51/026; B65B 51/04; B65B 7/00; B65B 9/20; A22C 11/125; B65H 16/00; B65H 16/06

USPC ........ 53/416, 417, 138.1, 128.1, 370, 138.4, 53/567, 576; 452/48; 242/594.1, 595
See application file for complete search history.

(56) References Cited

U.S. PATENT DOCUMENTS

| | | |
|---|---|---|
| 2,904,277 A | 9/1959 | Underwood |
| 3,738,590 A | 6/1973 | Granati |
| 3,795,085 A | 3/1974 | Andre et al. |
| 4,189,897 A | 2/1980 | Ailey et al. |
| 4,418,447 A | 12/1983 | Ziolko |
| 4,422,223 A | 12/1983 | Haines |
| 4,463,477 A | 8/1984 | Ziolko |
| 4,464,820 A | 8/1984 | Haines |
| 4,469,360 A | 9/1984 | Drury |
| 4,821,485 A | 4/1989 | Evans et al. |
| 4,865,261 A | 9/1989 | Bare et al. |
| 5,020,298 A | 6/1991 | Evans et al. |
| 5,085,036 A | 2/1992 | Evans et al. |
| 5,203,760 A | 4/1993 | Chen et al. |
| 5,218,750 A | 6/1993 | Hannula et al. |
| 5,259,168 A | 11/1993 | Evans et al. |
| D347,013 S | 5/1994 | Taguchi et al. |
| 5,471,815 A | 12/1995 | Evans et al. |
| 5,634,610 A * | 6/1997 | Walsh .................... B65H 49/32 242/422.4 |
| 5,644,896 A | 7/1997 | Evans et al. |
| D381,833 S | 8/1997 | Farndon |

(Continued)

*Primary Examiner* — Hemant M Desai
*Assistant Examiner* — William A Weller
(74) *Attorney, Agent, or Firm* — Christensen O'Connor Johnson Kindness PLLC

(57) ABSTRACT

Packaging systems include a rotating table and a plurality of circumferentially spaced apart spool mount assemblies mounted to the rotating table at respective clipper stations. The spool mount assemblies can include a laterally extending centrifugal force retention shaft that faces an outer perimeter of the table.

13 Claims, 10 Drawing Sheets

(56) References Cited

U.S. PATENT DOCUMENTS

| | | | | |
|---|---|---|---|---|
| 5,904,316 A * | 5/1999 | Dunning | ............... | A47K 10/38 |
| | | | | 225/42 |
| 5,944,280 A * | 8/1999 | Dimitri | ............... | B65H 49/321 |
| | | | | 242/129.7 |
| 5,967,451 A * | 10/1999 | Radaios | ............... | B65H 49/32 |
| | | | | 242/422.4 |
| 6,267,322 B1 * | 7/2001 | Harmathy | ............... | A47K 10/38 |
| | | | | 225/106 |
| 6,523,777 B2 * | 2/2003 | Gaudio | ............... | B65H 49/24 |
| | | | | 242/594.1 |
| 7,128,251 B1 * | 10/2006 | Galle | ............... | A47F 9/042 |
| | | | | 221/45 |
| 7,481,394 B2 * | 1/2009 | Gleason | ............... | B65H 49/32 |
| | | | | 242/588 |
| 8,006,463 B2 | 8/2011 | May et al. | | |
| 8,272,191 B2 * | 9/2012 | May | ............... | A22C 11/125 |
| | | | | 452/48 |
| 8,578,682 B2 * | 11/2013 | May | ............... | A22C 11/125 |
| | | | | 452/48 |
| 8,746,432 B2 | 6/2014 | May et al. | | |
| 9,010,072 B2 * | 4/2015 | May | ............... | A22C 21/00 |
| | | | | 53/138.3 |
| D737,352 S | 8/2015 | May | | |
| 9,555,907 B2 * | 1/2017 | May | ............... | A22C 11/125 |
| 2014/0013705 A1 * | 1/2014 | May | ............... | A22C 11/125 |
| | | | | 53/138.4 |
| 2015/0040519 A1 * | 2/2015 | May | ............... | A22C 11/125 |
| | | | | 53/416 |

* cited by examiner

SPOOL MOUNT ASSEMBLIES FOR ROTATING MULTI-CLIPPER PLATFORM SYSTEMS

RELATED APPLICATIONS

This patent application claims the benefit of and priority to U.S. Provisional Application Ser. No. 61/864,000 filed Aug. 9, 2013, the contents of which are hereby incorporated by reference as if recited in full herein.

FIELD OF THE INVENTION

The present invention relates to devices for clipping systems.

BACKGROUND OF THE INVENTION

Conventionally, in the production of goods such as, for example, explosives, meat or other products, the product is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming together a thin sheet of flexible material, typically elastomeric and/or polymeric material. U.S. Pat. Nos. 5,085,036 and 5,203,760 describe examples of automated substantially continuous-feed devices suitable for forming sheet material or flat roll stock into tubular film casings.

Rotating multi-clipper platform systems, such as the Rota-Clip® high speed packaging systems by Tipper Tie, Apex, N.C., have been used to produce increased quantities of clipped product. See, e.g., U.S. Pat. Nos. 4,821,485; 5,020,298; 5,259,168; 5,471,815; 5,644,896 and 8,006,463. The contents of the above referenced patents are hereby incorporated by reference as if recited in full herein.

SUMMARY OF EMBODIMENTS OF THE INVENTION

Some embodiments of the invention are directed to packaging systems that include a rotating table and a plurality of circumferentially spaced apart spool mount assemblies mounted to the rotating table at respective clipper stations. The spool mount assemblies also include a laterally extending centrifugal force retention shaft that faces an outer perimeter of the table.

The spool mount assemblies can include first and second side-by-side spool holding cavities. The spool mount assemblies can include inner rollers and outer rollers with a respective holding cavity therebetween. The retention shaft can reside a distance above an axially extending centerline of the outer rollers.

The retention shaft can have an axially extending centerline that resides closer to an outer perimeter of the table than the axially extending centerline of the outer rollers.

The spool mount assemblies can include a laterally extending roller residing at an outer end of a spool cavity. The retention shaft can have an axially extending centerline that is between about 0.5 to about 5 inches above an axially extending centerline of the laterally extending roller.

The spool mount assemblies can include first and second longitudinally extending outer mounting members that are spaced apart across two side-by-side spool cavities, a longitudinally extending center mounting member extending between the side-by-side spool cavities, and laterally extending and longitudinally spaced apart inner and outer rollers on each end of the spool cavities attached to the center mounting member and at least one of the first or second longitudinally extending mounting members. The retention shaft can reside above the laterally extending rollers.

The system can include a longitudinally extending center member that separates the side-by-side spool holding cavities and holds front and back laterally extending spool rods that attach to the longitudinally extending outermost mounting members.

The spool mount assemblies can include a base with upper and lower plates that slidably engage the table. The upper plate can include at least one pin that moves vertically between retracted and extended positions to releasably engage an aperture in the table to lock into a desired radial location on the table to thereby attach to the table in alignment with a clipper without requiring attachment to a clipper at a respective clipper station.

The first and second longitudinally extending outer mounting members can include an end segment that rises above a primary body segment and holds the retention shaft thereon.

The retention shaft can be fixedly attached to a respective spool mount assembly and can be sized and configured to remain in position while a spool is removed from or loaded in a respective spool holding cavity.

The retention shaft can be pivotably attached to a respective spool mount assembly.

The retention shaft can be releasably attached to a respective spool mount assembly.

The system can include a plurality of clippers, one residing in each respective clipper station and being aligned with a respective spool mount assembly. Each spool holding cavity can be configured to allow a spool of clips to be inserted into the cavity while a corresponding proximate clipper remains in position.

The table can include a plurality of pie-pan members (e.g., "wedge shaped or "pie-slice like" members) that are spaced apart with radially extending gap spaces so that a narrow end of the pie-shaped members reside proximate a center of the table. The table can include cooperating plates with slots that reside along outer edges of the pie-shaped members. The spool mount assemblies can each include a base that slidably engages the cooperating plate slots and a handle that releases and engages a lock that allows an operator to radially slide and lock a respective spool mount assembly into a desired radial position on the table.

Other embodiments are directed to a spool mount assembly for a rotating packaging system. The spool mount assembly can include: first and second side-by-side spool holding cavities; and at least one laterally extending centrifugal force retention shaft that resides a distance above at least one spool holding cavity and is sized and configured to reside on one end portion of the spool holding cavity.

The spool holding cavities can have a rectangular perimeter when viewed from the top, with outer long sides and laterally extending short sides, each short side comprising at least one laterally extending roller. The at least one retention shaft can reside a distance above and in front of an axially extending centerline of the at least one roller of one of the laterally extending short sides.

The retention shaft can have an axially extending centerline that is between about 0.5 to about 5 inches above an axially extending centerline of laterally extending rollers residing at an outer end of the spool cavities.

The assembly can include: first and second longitudinally extending outer mounting members that are spaced apart across the first and second side-by-side spool holding cavities; and laterally extending rollers attached to the first and second longitudinally extending outer mounting members, including at least one roller at each of an inner and outer end of the spool cavities. The at least one retention shaft can reside above and proximate the outer end rollers.

The assembly can include a longitudinally extending center member that separates respective side-by-side spool holding cavities and holds front and back laterally extending spool rods that attach to the longitudinally extending outer mounting members to hold a respective at least one roller.

The first and second longitudinally extending outer mounting members can be flat plates that include an end segment that rises above a primary body segment and holds the retention shaft thereon.

Still other embodiments are directed to methods of inhibiting a spool of clips from dislodging during rotational operation of a multi-clipper rotating packaging machine. The methods include: (a) placing a spool of clips in a spool mount assembly held by a rotating table, the spool mount assembly comprising side-by-side spool holding cavities with at least one centrifugal force retention shaft that laterally extends across the spool cavities a distance above a lower end of the spool so as to reside at a height between about 2-6 inches above the lower end of the spool and that faces an outer perimeter of the table; (b) rotating a table holding clippers and a respective spool mount assembly at respective clipper stations; (c) applying clips to lengths of product using the clippers; and (d) retaining the spools in the spool holding cavities using the retention rod when the table rotates at a high speed of between about 25-29 rotations per minute and the spool mount assemblies reside proximate an outer perimeter of the table.

Yet other embodiments are directed to methods of assembling a rotating table with clippers associated with a packaging system. The methods include: (a) providing a rotating table with a plurality of clipper stations; and (b) slidably attaching a plurality of spool mount assemblies to the table, one at each clipper station, at a desired radial position that can be selected from different radial positions associated with shorter and longer target products, the longer products associated with table positions closer to an outer perimeter of the table. The spool mount assemblies can include a centrifugal force retention shaft that laterally extends across two side-by-side spool cavities and that resides between about 2-6 inches above the lower end of the spool when held in the spool cavity.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

These and other objects and/or aspects of the present invention are explained in detail in the specification set forth below.

DETAILED DESCRIPTION OF EMBODIMENTS OF THE INVENTION

Figure 1:
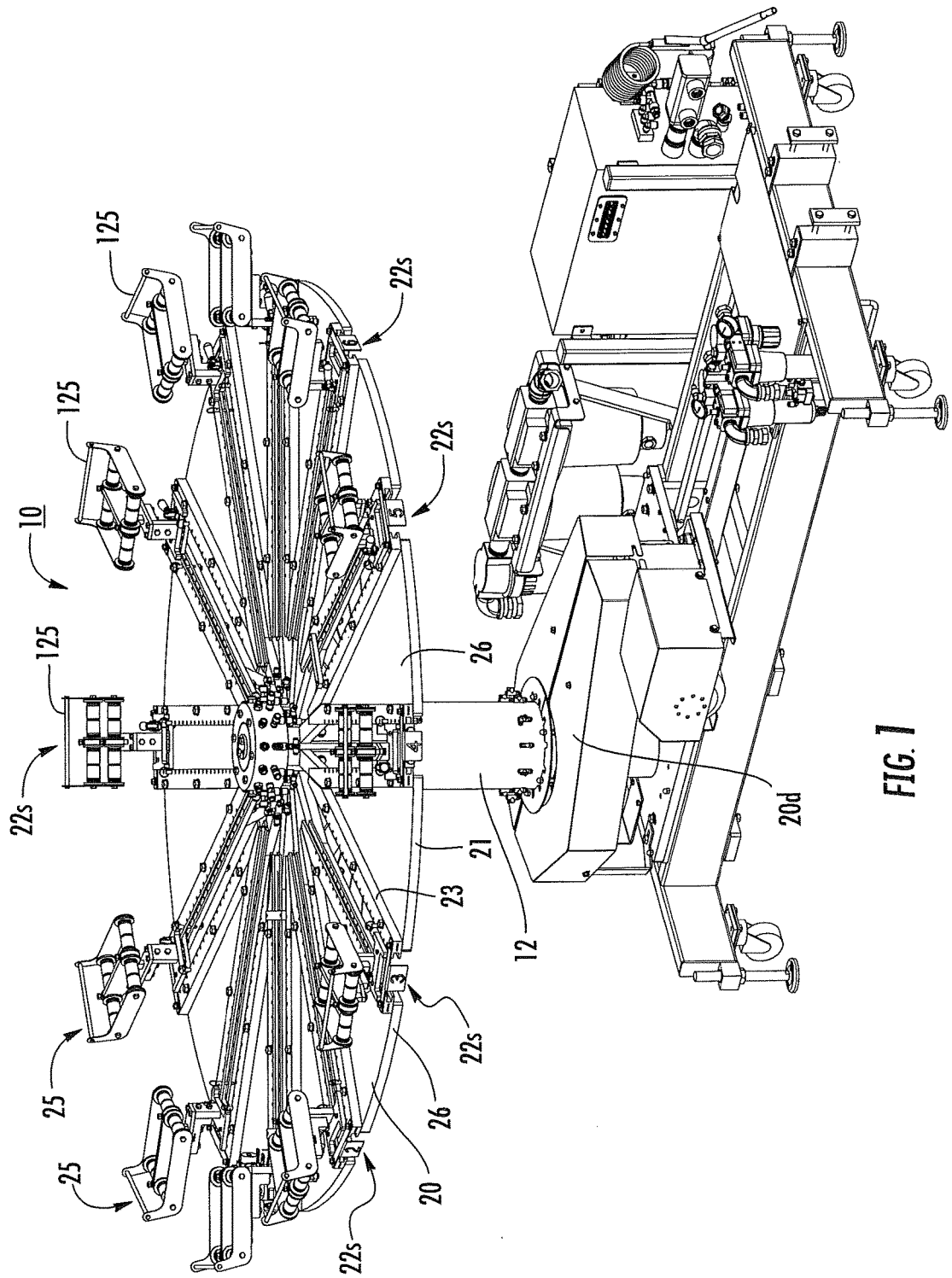
FIG. 1 is a front perspective view of a multi-clipper station rotating platform or table system according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one embodiment may be used alone or with another embodiment although not specifically described with respect to that other embodiment.

In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise.

The term "concurrently" means that the operations are carried out substantially simultaneously.

The term "about" means that the noted value can vary by +/−20%.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected to the other element or intervening elements may be present. In contrast, when a feature or element is referred to as being "directly connected", "directly attached" or "directly coupled" to another element, there are no intervening elements present. The phrase "in communication with" refers to direct and indirect communication. Although described or shown with respect to one embodiment, the features so described or shown can apply to other embodiments.

The term "circuit" refers to software embodiments or embodiments combining software and hardware aspects, features and/or components, including, for example, at least one processor and software associated therewith embedded therein and/or executable by and/or one or more Application Specific Integrated Circuits (ASICs), for programmatically directing and/or performing certain described actions, operations or method steps. The circuit can reside in one location or multiple locations, it may be integrated into one component or may be distributed, e.g., it may reside entirely in a workstation or single computer, partially in one workstation, cabinet, or computer, or totally in a remote location away from a local display at a workstation. If the latter, a local computer and/or processor can communicate over a LAN, WAN and/or internet to transmit patient images.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The frame can be a floor mount frame. The term "automated" means that operations can be carried out substantially without manual assistance, typically using programmatically directed control systems and electrical and/or mechanical devices. The term "semi-automatic" means that operator input or assistance may be used but that most operations are carried out automatically using electromechanical devices and programmatically directed control systems.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The term "pie pan" refers to table members that have a wedge shape or pie-slice like shape with a narrow end facing a center of the rotating table.

Figure 2:
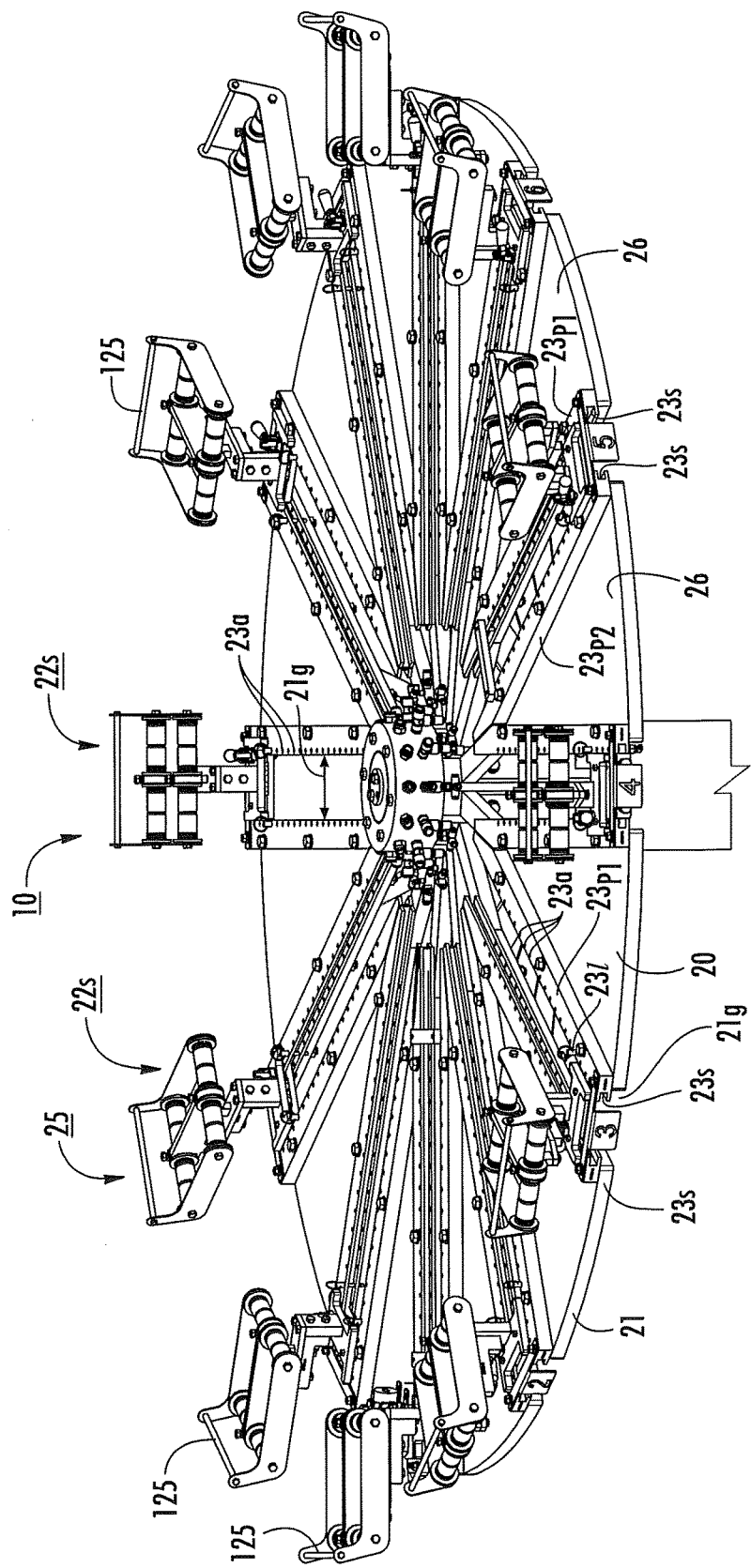
FIG. 2 is an enlarged view of the system shown in FIG. 1.

Referring now to the figures, as shown in FIGS. 1 and 2, the system 10 includes a vertical column 12 holding a rotating platform 20 with a table top 21. The system 10 has circumferentially spaced apart clipper stations 22s that holds respective clippers 22 (FIG. 3), typically double clippers. The system 10 also includes a drive system 20d that rotates the column/table at a desired speed and can automatically vary the speed depending on production requirements/inputs.

Figure 3:
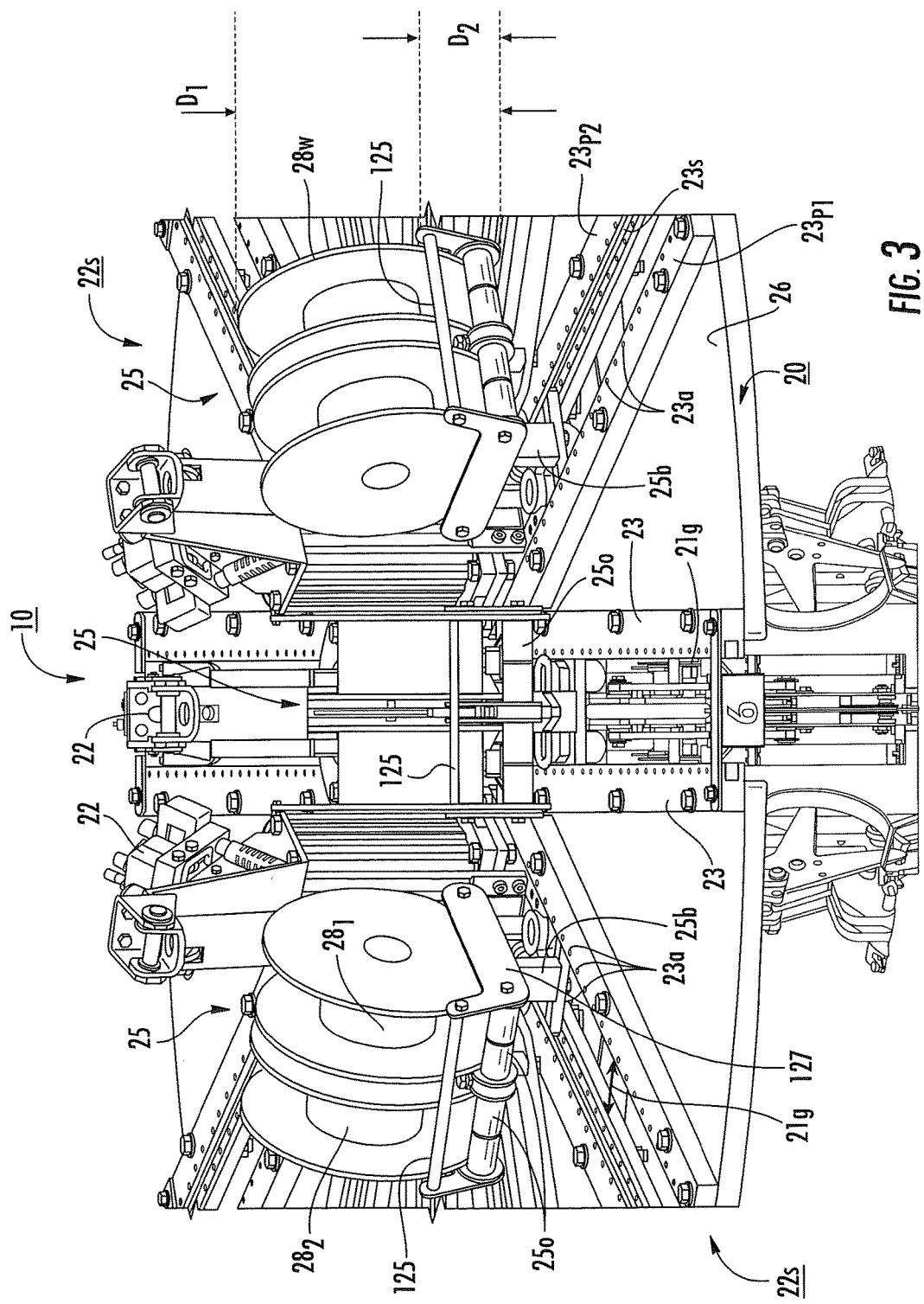
FIG. 3 is an enlarged partial view of the system shown in FIG. 1 illustrating clippers and spools held in the spool mounts shown in FIG. 1 according to embodiments of the present invention.

The air supply lines that connect to the various clippers can travel down the column 12 (inside a casing) to an air supply. The system 10 can include a single common main air supply that can be diverted to feed all of the clippers 22 (FIG. 3). Alternatively, each or groups of the clippers may have a dedicated discrete air supply. Each clipper 22 can include on-board air supply conduits/lines with valves that releasably connect to the air supply lines on the column 12. The main air supply can be provided at any desired operating pressure sufficient to run the clippers at a desired speed, typically provided at a pressure between about 80-125 psi.

Optionally, the system 10 can interchangeably operate with large and small clippers 22 which can interchangeably attach to the air supply lines at each clipper station 22s on the platform 20 and the clip air supply lines on the platform can have standardized fittings that interconnect to each type of clipper.

The system can be configured to clip encased elongated or tubular product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include powders such as granular materials including grain, sugar, sand, explosives and the like or other flowable or emulsion materials including wet pet food (similar to that held conventionally in cans) or other powder, granular, solid, semi-solid or gelatinous materials. The product may be a packaged in any suitable industry including food, aquaculture, agriculture, environment, chemical, explosives, or other applications.

Embodiments of the present invention are particularly suitable for producing encased products using the clippers to apply clips to seal or clip end portions of long products held in the casings. The product may be a linked chain of elongated extruded product held in a casing. The casing or covering can be any suitable material or materials (edible or inedible, natural or synthetic) such as, but not limited to, collagen, cellulose, elastomeric, polymeric and/or plastic casing. The term "film" refers to a thin flexible sheet of covering material. When used with food products, the film, casing or covering should be food-compatible. The film/casing can be sealed in situ during operation at a speed that feeds the rotating table of clippers at a desired production speed.

Turning again to FIGS. 1-3, although shown as including 12 clipper stations 22s with respective (typically dual) clippers 22, not all clippers 22 need be operational during a packaging operation (e.g., alternating ones can be deactivated), or the table 20 may include other numbers of clippers 22, typically between 10-14. Rota-Clip® systems are available from Tipper Tie, Apex, N.C. The number of clippers 22 used in combination with the circumference of the table 20, and/or the radially adjusted position of the clippers 22 on the table 20 can allow for different lengths of end product to be produced. For example, for the same clipper radial positions, one operation using all 12 clippers 22 can produce a six-inch product and, if every other clipper 22 is deactivated, up to a 36 inch product. Larger and smaller length sizes can be achieved using alternate configurations.

As with conventional rotating platform clippers, in operation, the sealed filled tubular covering can be clipped under the platform table surface.

In some embodiments, the table 20 can accept different sized clippers 22, such as a "100" series clipper available from Tipper Tie, Inc., Apex, N.C. and a "200" series clipper available from Tipper Tie, Inc., Apex, N.C. The 100 series can have a 100T clip size and the 200 series clipper can operate with a Z200 clip size.

FIGS. 1 and 2 illustrate that the table 20 can have circumferentially spaced apart pie pan members 26 (shown as 12 such members) that hold spaced apart plates $23p_1$, $23p_2$, on long ends thereof. The plates $23p_1$, $23p_2$ are typically mounted to an upper surface of the pie pan members 26, but they can be mounted to the lower surface of the pie pan members 26, in other embodiments. Cooperating pairs of the plates $23p_1$, $23p_2$ on neighboring pie pan members 26 can be configured and/or oriented to provide cooperating slots 23s that face each other across a radially extending gap 21g. Each of the plates $23p_1$, $23p_2$ can include (typically laterally aligned) radially spaced apart apertures 23a that releasably receive a respective locking pin 23l (FIG. 2) to hold a clipper 22 in a desired radial position on the table 20. The plates $23p_1$, $23p_2$ can be configured as U-channel members with the long "arms" of the U oriented horizontally and the open end of the U facing across the gap space 21g to form the cooperating slot 23s. In other embodiments, the plates $23p_1$, $23p_2$ can provide suitable slots in other manners, e.g., via cooperating separate upper and lower plate pairs, for example.

Figure 4:
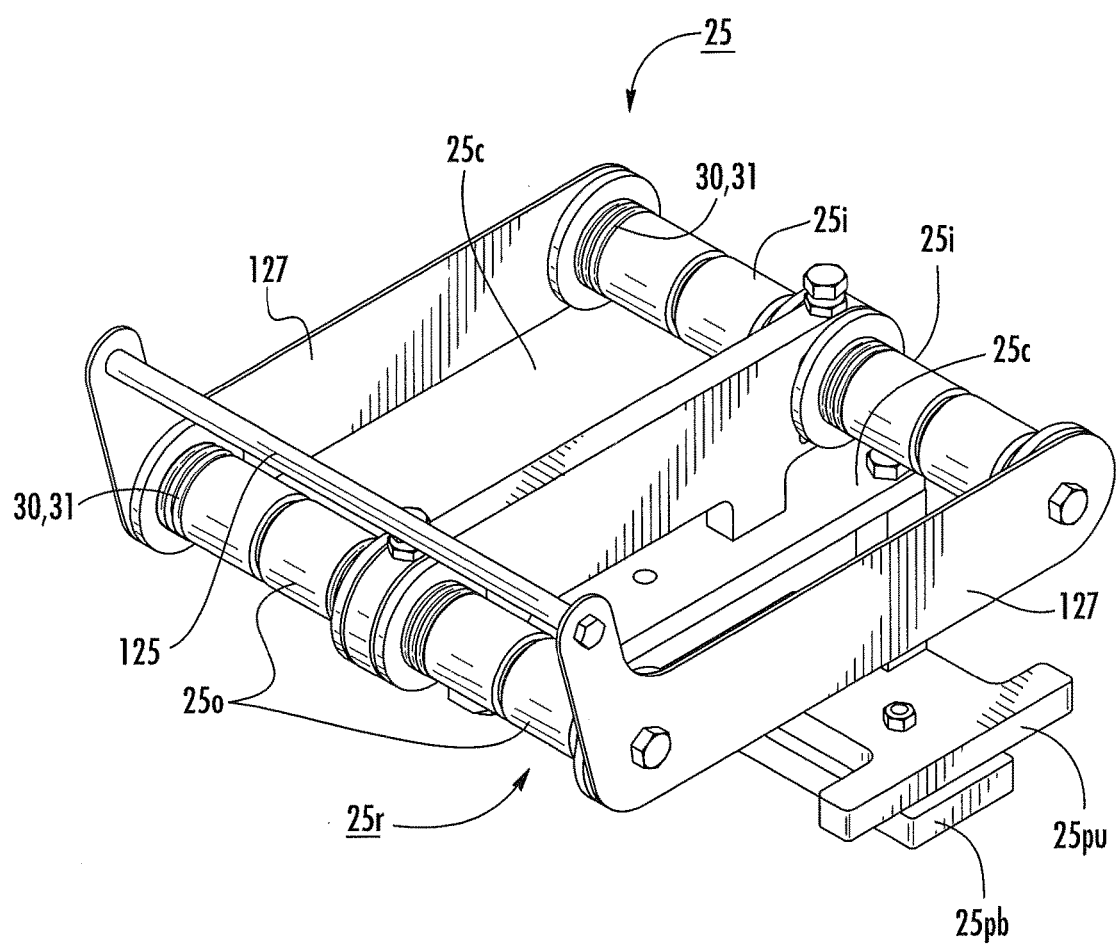
FIG. 4 is a front side perspective view of an exemplary spool mount assembly according to embodiments of the present invention.
Figure 5:
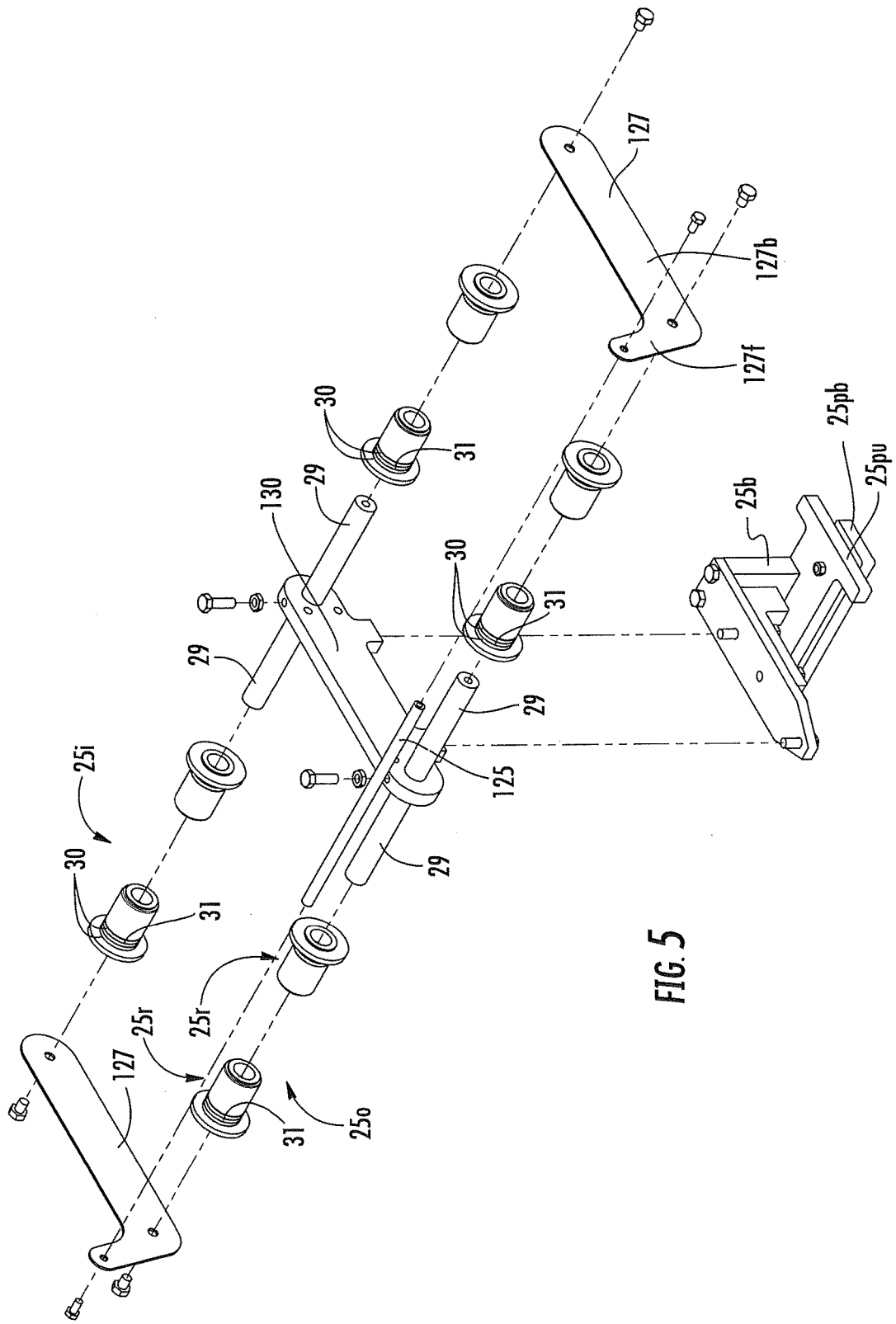
FIG. 5 is an exploded, perspective view of the spool mount assembly shown in FIG. 4.

FIGS. 4 and 5 illustrate that the spool mount assembly has a support base 25b that can include overlying first and second plates 25pu, 25pb. As shown in FIG. 2, for example, the upper plate 25u can reside on top of the upper surface of the cooperating table plates $23p_1$, $23p_2$ across the gap 21g while the lower plate 25b can reside in the slot to snugly hold the spool mount assembly in position. The upper plate 25u can hold the locking handle and cause a locking pin 110 (FIG. 6B) to travel vertically between retracted and extended positions. In the extended down position, the locking pin 110 engages an aperture in the table support 23a and in the underlying second plate 25b. In other embodiments, the support plates $23p_1$, $23p_2$ can be attached via vertical wall segments that provide apertures for laterally extending locking pins (not shown).

FIG. 4 illustrates a spool mount assembly 25 that has at least one spool cavity 25c (also called a "cradle"), typically two side-by-side spool cavities for double clipper operation. When assembled, the spool mount assembly 25 can releasably hold a spool of clips in a respective cavity at respective clipper stations 22s (FIGS. 1, 2). FIG. 3 shows that the spool mount assembly 25 can hold first and second clip spools $28_1$, $28_2$ side by side at respective clipper stations 22s on the table 20.

As shown in FIGS. 1-4, the spool mount assembly 25 can include at least one laterally extending retainer shaft 125 that, in position, faces the outer perimeter of the table 20 (in a direction away from the clipper and table center). The retainer shaft 125 can be of any suitable size and shape. The shaft can be tubular with a circular profile or may have another shape. The retainer shaft 125 can have a cross-sectional shape that is smaller than that of the adjacent roller/outer member 25o. Although shown as a single shaft 125 that extends across both of the side by side cavities 25c of a respective spool mount assembly, each cavity 25c can have its own retainer shaft rather than a single shaft that extends across both cavities. Further, a plurality of vertically spaced apart, laterally extending retainer shafts 125 can be used. Also, the shaft 125 can be configured to laterally extend over only a portion of the cavity 25c.

The retainer shaft 125 can extend in a direction that is orthogonal to the radially extending split lines 21g and/or across the spool width and can be configured to abut the outer perimeter of the circular spool walls 28w during operation.

The retainer shaft 125 is configured to trap/retain the spool 28 in the cavity of the spool assembly 25c during rotation when exposed to centrifugal forces that might otherwise eject the spools from the spool mount assembly 25 when the spool mount assembly is located at an outer portion of the table (e.g., the position shown in FIG. 1), at certain rotational speeds and/or acceleration, particularly when used to produce certain longer length products, e.g., at a rotational speed of between about 25 RPM to about 29 RPM, including at least 25 RPM to 29 RPM. In some embodiments, at 29 RPM, the system 10 can produce 350 pieces per minute.

As shown in FIG. 3, for example, the retainer shaft 125 can reside a distance D2 above the lower end of the spool 28 when held in the spool mount assembly 25. For about a 10 inch to about a 10.5 inch diameter spool, the distance D2 can be between about 10-60% of the overall diameter, e.g., between about 1-6 inches, typically about 2.5 inches. However, the shaft or shafts 125 can reside at other heights above the table support surface and/or at different heights with respect to the height of a respective spool. FIG. 6D illustrates other exemplary dimensions.

The spool mount assembly 25 can be configured for rapid clip spool load and reload as the clipper 22 remain in position while the clip spool 28 with the clips can be easily inserted or loaded (e.g., placed or dropped) into the cavity 25c of the spool mount assembly 25. The spool can reside in the respective spool cavity 25c of the spool mount assembly 25 otherwise unconstrained but for the centrifugal retention provided by the retainer shaft 125. In some embodiments, the retainer shaft 125 can be sized and configured to also be able to remain in its fixed position during reload/loading of the spools 28. In other embodiments, the retainer shaft 125 can be removed or pivoted to load/reload (see, e.g., FIGS. 7A, 7B and 8).

The spool mount assembly 25 can have two cavities 25c that can be configured to snugly hold two side-by-side clip spools $28_1$, $28_2$. As shown in FIG. 3, the assembly 25 is aligned with and can be mounted to the clipper station 22. The assembly 25 can be attached to only the table (e.g., mounted to the cooperating plates $23p_1$, $23p_2$) and can be unattached to the clipper to thereby reduce vibrational forces thereon during production.

The spool mount assembly 25 can be configured to define two spool holding cavities 25c that extend radially between inner and outer, radially spaced apart, rigid (typically elastomeric) tubular bars or rollers, 25i, 25o, respectively. The cavities 25c can optionally be configured to hold different size clips (such as the "100" and "200" size clips and associated clippers available from Tipper Tie, Inc., Apex, N.C.). The spool width for each different clip size can be substantially the same. As noted above, the spool mount assembly 25 can include a base 25b that radially slides into the slots 23s to a desired mounting location on the platform or table 20.

As shown in FIG. 5, in some embodiments, the members 25i, 25o are rollers 25r that can mount on an internal rod 29. The rod 29 may extend from an optional center support member 130. Where single cavity designs are used, the center support is not required. A respective rod 29 can attach to one or both outer mounts 127. The members 25i, 25o can reside at substantially the same level or one can reside above the other.

The rollers 25r can spin on the rod 29 as the spool 28 spins to facilitate feeding the clips to the clipper during operation. The rollers 25r can be configured as cooperating split rollers. Optionally, the outer circumference of the rollers can include grooves 30 that hold optional grip members 31 with increased friction relative to the roller material, e.g., an O-ring such as a square profile O-ring. In other embodiments, the rollers do not include the grooves and can have a continuous or substantially continuous (e.g., grooveless) outer diameter.

Figure 6A:
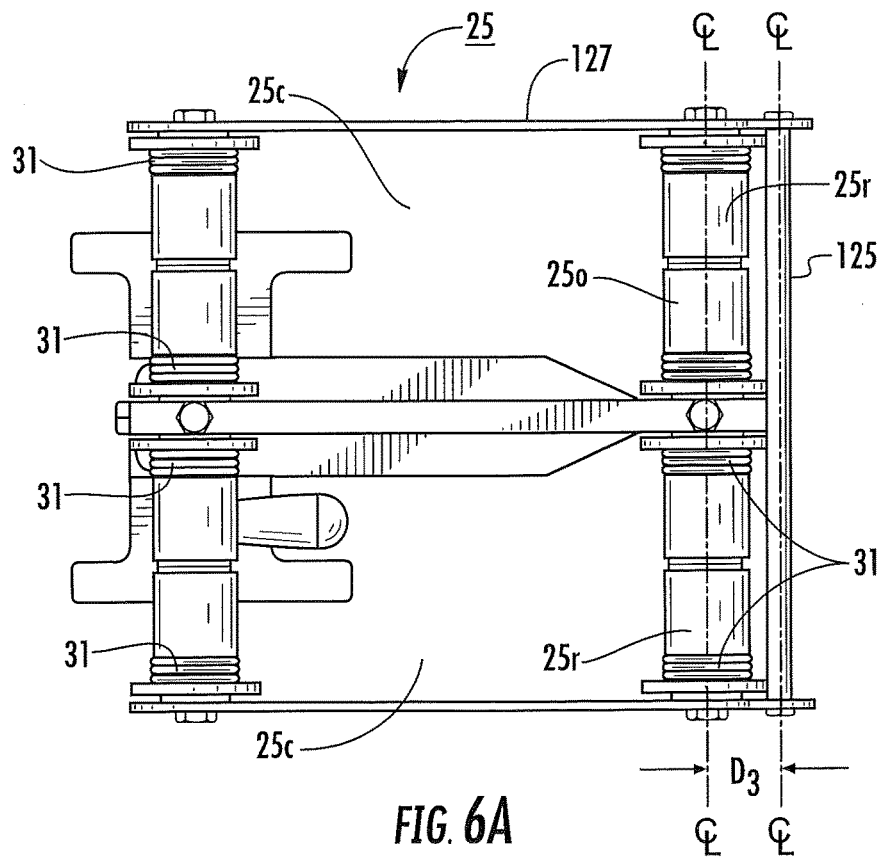
FIG. 6A is a top view of the device shown in FIG. 5.
Figure 6B:
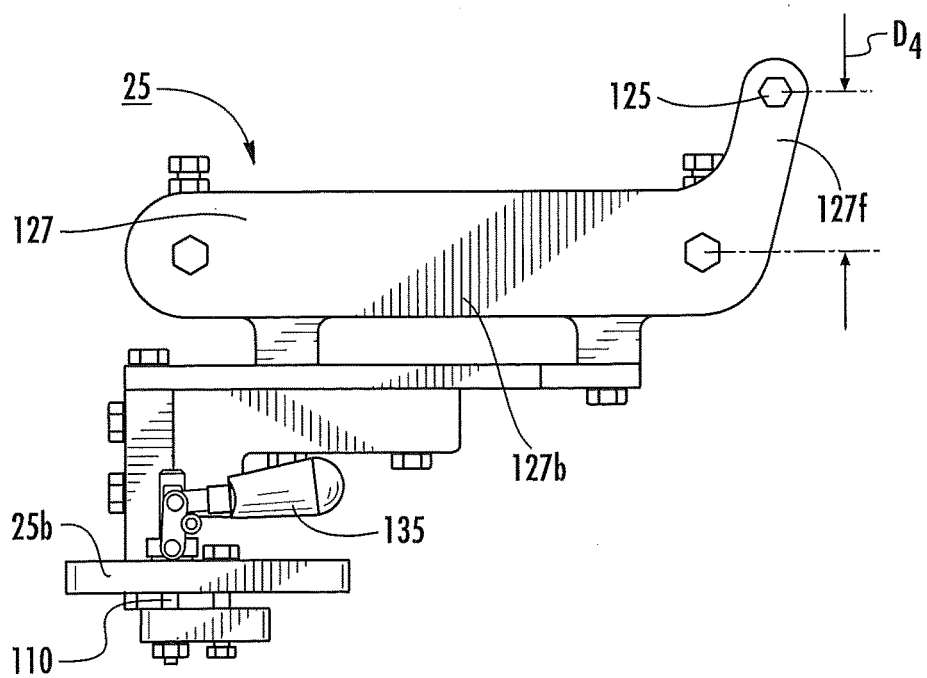
FIG. 6B is a side view of the device shown in FIG. 6A.
Figure 6C:
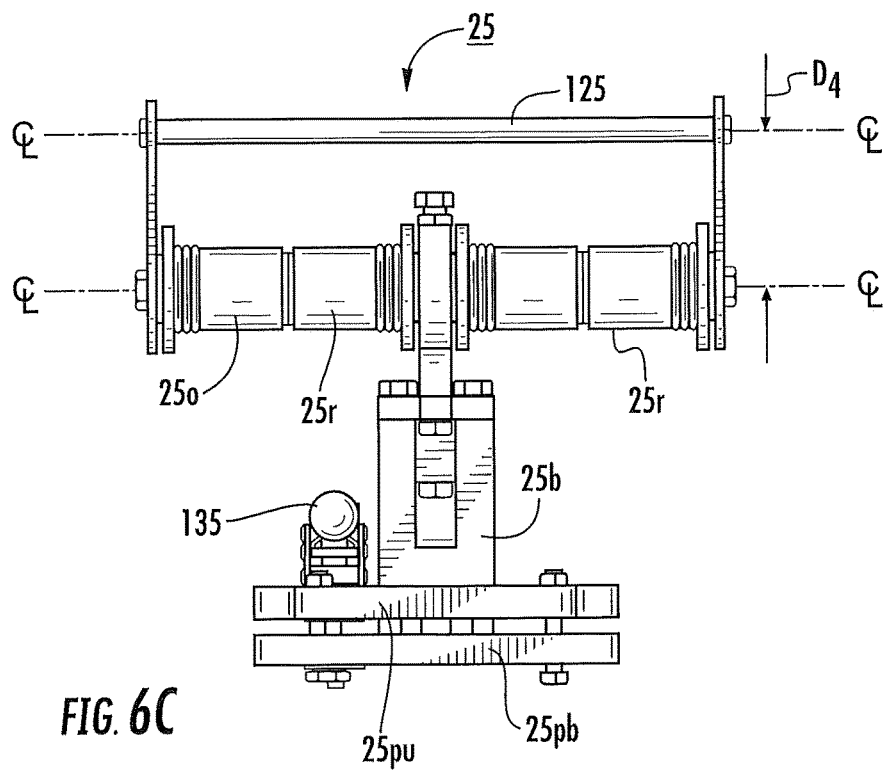
FIG. 6C is an end view of the device shown in FIGS. 6A and 6B.
Figure 6D:
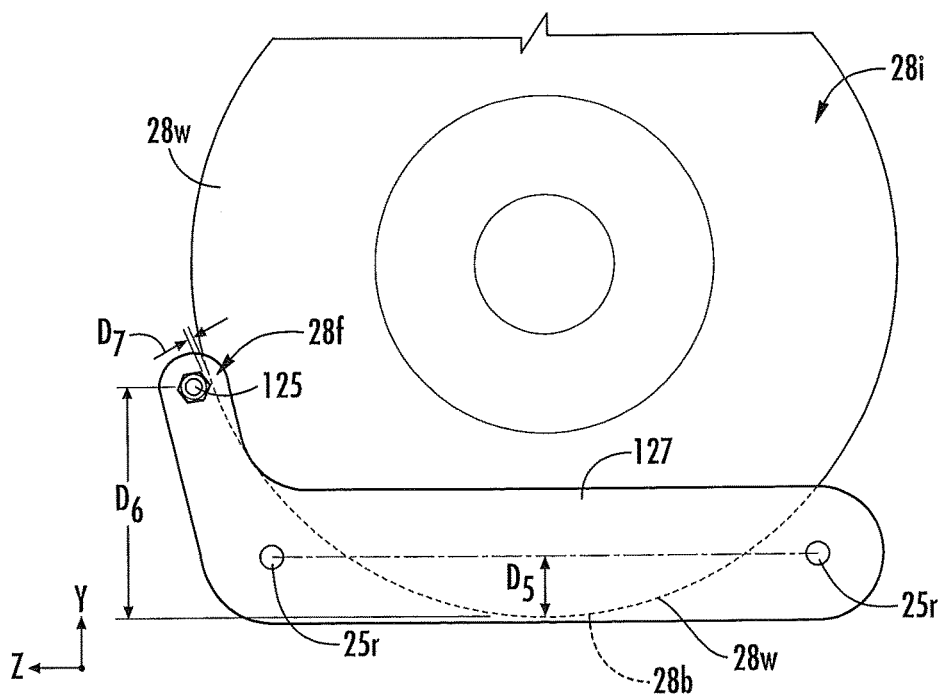
FIG. 6D is a side schematic, enlarged view of an exemplary spool in position in the spool mount according to embodiments of the present invention.

As shown in FIGS. 6A and 6C, for example, the grip members 31 can be provided as a plurality of regularly or irregularly spaced apart members on each opposing end of a roller in a respective cavity 25c. In some embodiments, there can be between 2-5 closely spaced O-rings 31 at each end of a respective roller 25r, e.g., 24 rollers with sets of 3 at each end of a respective roller 25r (in eight locations, two locations on each of four rollers with a respective inner and outer roller for each cavity 25c). The remaining laterally extending portion of the rollers between the ends of the respective rollers with the grip members 31 can be smooth and without such grip members. The outer surfaces of the rollers 25r can include other configurations (surface features), members and/or materials that may be used to provide the increased frictional surfaces including embossed surfaces, elastomeric overmolds and the like.

As shown in FIGS. 6A-6C, in some embodiments, the retainer shaft 125 resides at a height D4 that is a distance between about 0.5 inches to about 5 inches, typically about 2.5 inches, above the axially extending centerline of the rollers 25r. The retainer shaft 125 can have an axially extending centerline (C/L) that is slightly forward a distance D3 of the axially extending centerline (C/L) of the underlying (outer) rollers 25r, typically between about 0.5 inches to about 3 inches, such as about 1.15 inches.

Referring to FIG. 6D, in some embodiments, the axially extending centerline C/L of the rollers 25r is at a distance D5 above the bottom of the spool wall 28w when the spool 28 (either $28_1$ or $28_2$) is in the spool mount cavity 25c. The distance D5 can be between about 0.5 inches to about 3 inches, typically about 1 inch. The forward end of the spool 28f adjacent the retention shaft 125 can be closely spaced apart a distance D7 from the shaft 125, e.g., between about 0.010 inches to about 0.050 inches. The axially extending centerline C/L of the retention shaft 125 can reside at a height D6 that is between about 3-5.5 inches. When the distance D5 is about 1 inch, the distance D6 can be about 3.5 inches above the bottom 28b of the spool wall 28w when the spool is held in position in the spool cavity 25c.

In the embodiment shown in FIGS. 4 and 5, the spool mount assembly 25 can include outer mounting members 127 which can be plates with a primary body 127b that merges into a forward end 127f that rises a distance above the primary body thereof to provide support for the retainer shaft 125. The retainer shaft 125 can be fixedly attached to the outer mounting members 127 and span across both cavities 25c. The retainer shaft 125 can also be configured to slidably engage the spool mount assembly 25. For example, the shaft 125 can be configured to be slidably inserted across one or both of the cavities 25c into the aperture in the mounting member 127 after a spool is loaded, then locked into position. Alternatively, the shaft 125 can be configured to pivot off of one of the mounting members and lock against the other to allow ease of access to the cavities 25c for loading and unloading spools.

The spool mount assembly 25 can include a lock with a pivoting handle 135 (FIGS. 6A-6C) that allows a user to easily lock the spool mount assembly into a desired radially extending location on the table 20.

Figure 7A:
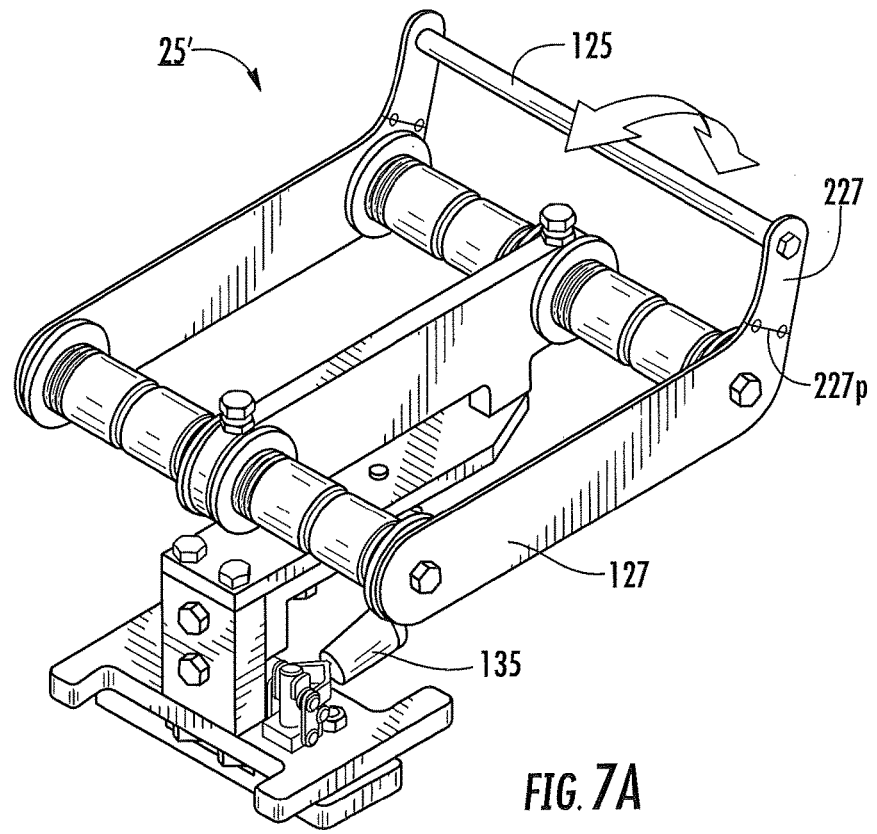
FIG. 7A is a rear side perspective view of another embodiment of a spool mount assembly according to embodiments of the present invention.
Figure 7B:
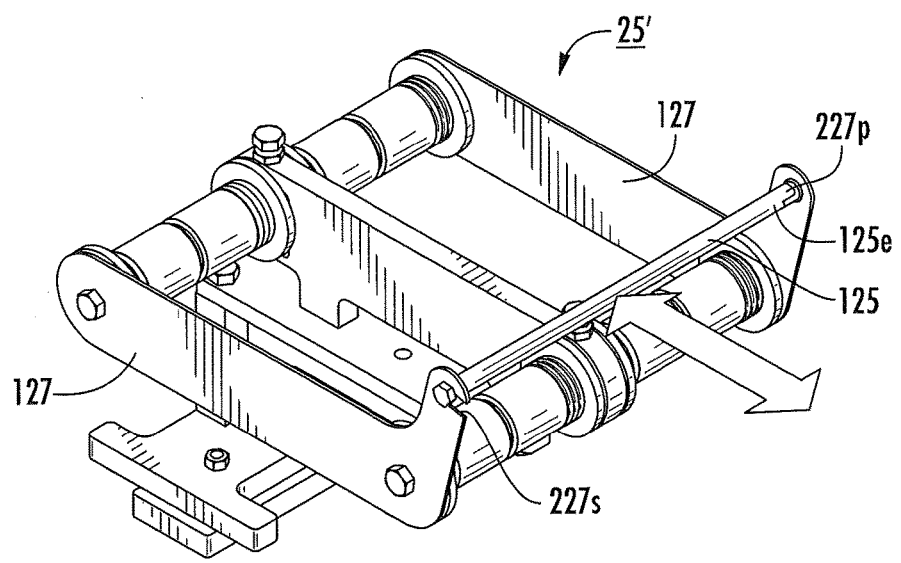
FIG. 7B is a front side perspective view of another exemplary spool mount assembly according to embodiments of the present invention.

FIGS. 7A and 7B illustrate that the spool mount assembly 25' can be configured to pivotably attach the retainer shaft 125. FIG. 7A illustrates that the upward end portion of the mounting member 227 can pivot down via pivot 227p to allow ease of access for loading and unloading. The pivoting attachment can be spring loaded to bias the shaft 125 into a desired home position. FIG. 7B illustrates that one end of the shaft itself 125e can be pivotably attached to the upper end portion of the mounting member 127 via pivot 227p to allow the shaft 125 to pivot outward and allow the other end portion of the shaft 125 to slide into and out of a slot or channel 227s in the mounting member 127.

Figure 8:
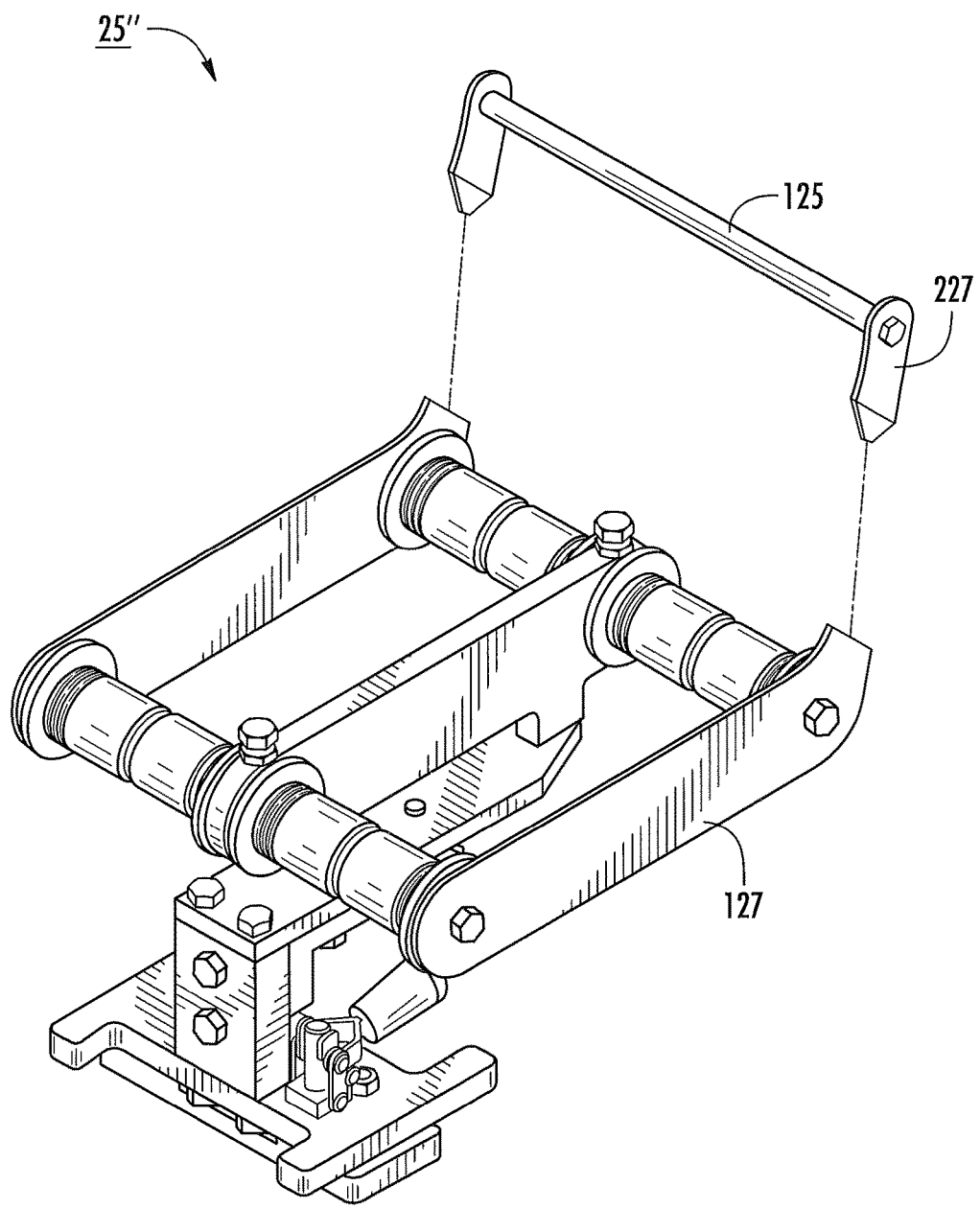
FIG. 8 is a rear side perspective view of another embodiment of a spool mount assembly according to embodiments of the present invention.

FIG. 8 illustrates that the spool mount assembly 25" can releasably attach the retainer shaft 125, e.g., releasably attach the shaft 125 to one or both of the mounting members 127 to allow for ease of access to load and/or unload spools 28. In the embodiment shown, the retainer shaft 125 can be held by mounting members 227 that slidably engage receiving channels in the lower members 127, but other releasable attachment configurations can be used. Locks or retention members/features can be used with the pivoting and releasable configurations (not shown).

The system 10 can include a Siemens variable frequency drive and integral safety system, including, for example, a Siemens Step7 300 Processor with Integral Safety Systems, including a Siemens touch screen, motor drives and safety modules. The touch screen can include a series of iconic and/or pictorial image display of user-activated or status indicating features for various components, e.g., adhesive nozzle down, pump "on or off" and the like. The electric motors can be servo motors such as available from Elwood Getty. The system can include automatic positioning of vacuum belt drives. The system 10 can be Ethernet ready for remote access via VPN and may also be PROFIBUS ready, foreign language supported. In some embodiments, the system 10 can be configured to operate with an automated synchronized drive control system that may use a single virtual axis for ramp-up to maximum operational speed that synchronizes the covering (e.g., film) drive, the adhesive extruder drive and the rotating table drive (using the Siemens or a similar variable frequency drive system). Each drive system can operate at a selected (variable or constant) speed. The film and extrusion drive can operate to provide sealed tubular covering at any desired speed, including between about 10-300 feet per minute, typically between about 150-300 feet/min; more typically, the machine can operate at an operating speed of about 300 feet/minute.

Figure 9:
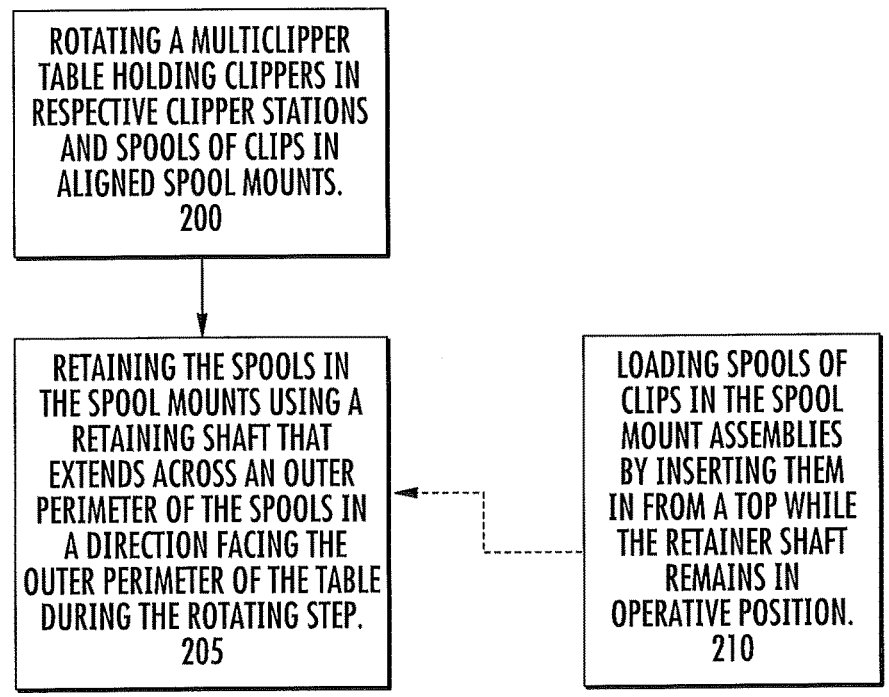
FIG. 9 is a flow chart of exemplary operations that can be used to operate a rotating multiple clipper table according to embodiments of the present invention.

FIG. 9 is a flow chart of exemplary operational actions that can be carried out according to embodiments of the present invention. A multi-clipper table holding clippers in respective clipper stations and spools of clips in aligned spool mounts is rotated (block 200). The spools in the spool mounts are retained using a retaining shaft that extends across an outer perimeter of the spools in a direction facing the outer perimeter of the table during the rotation (block 210).

Optionally, spools of clips are loaded in the spool mount assemblies by inserting them in from a top while the retainer shaft remains in operative position (block 210).

Figure 10:
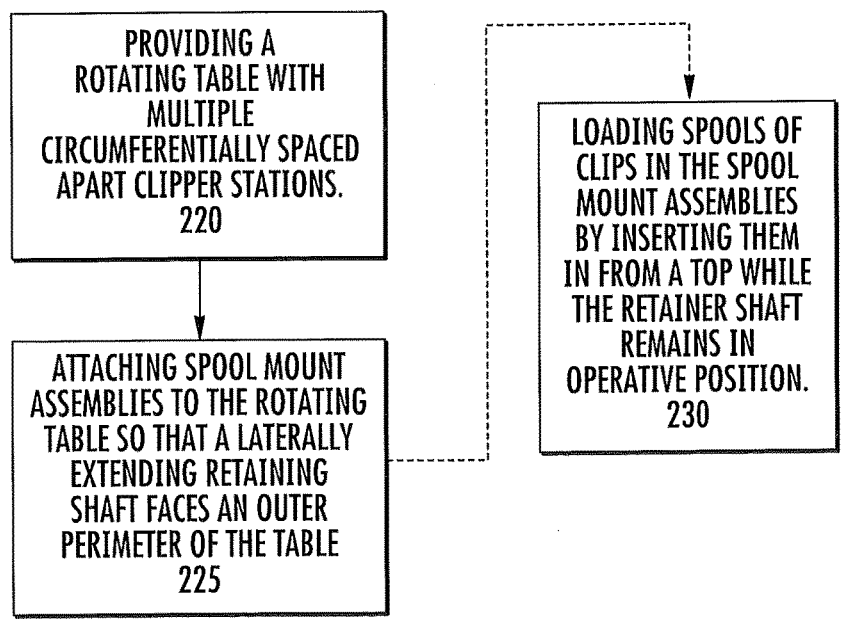
FIG. 10 is a flow chart of exemplary operations that can be used to assemble a rotating platform system according to embodiments of the present invention.

FIG. 10 is a flow chart of an assembly process according to embodiments of the present invention. A rotating table with multiple circumferentially spaced apart clipper stations is provided (block 220). Spool mount assemblies are attached to the rotating table so that a laterally extending retaining shaft faces an outer perimeter of the table (block 225).

Optionally, spools of clips can be loaded in the spool mount assemblies by inserting them in from a top while the retainer shaft remains in operative position (block 230).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A packaging system comprising:
a rotating table; and
a plurality of spool mount assemblies circumferentially spaced apart from each other and mounted to the rotating table at respective clipper stations, the spool mount assemblies comprising:
first and second longitudinally extending outer mounting members;
laterally extending and longitudinally spaced apart inner and outer rollers attached to the first and second longitudinally extending mounting members to define a spool holding and retention cavity; and
a centrifugal force retention shaft mounted on the first and second longitudinally extending outer mounting members, to extend laterally to the first and second longitudinally extending outer mounting members, the centrifugal force retention shaft facing an outer perimeter of the rotating table, said centrifugal force retention shaft positioned relative to the laterally extending and longitudinally spaced apart inner and outer rollers to enable a spool to be downwardly loaded into and upwardly removed from the spool holding and retention cavity without movement of the centrifugal force retention shaft.

2. The system of claim 1, wherein the spool mount assemblies include first and second side-by-side spool holding and retention cavities, wherein the spool mount assemblies include the inner rollers and outer rollers with a respective side-by-side spool holding and retention cavity therebetween, and wherein the centrifugal force retention shaft resides a distance above an axially extending centerline of the outer rollers.

3. The system of claim 2, wherein:
the centrifugal force retention shaft has an axially extending centerline that resides closer to the outer perimeter of the rotating table than the axially extending centerline of the outer rollers.

4. The system of claim 1, wherein the centrifugal force retention shaft has an axially extending centerline that is between about 0.5 to about 5 inches above an axially extending centerline of the laterally extending outer roller.

5. The system of claim 1, wherein the spool mount assemblies comprise:
the first and second longitudinally extending outer mounting members being spaced apart across two side-by-side spool holding and retention cavities;
a center mounting member extending longitudinally relative to the first and second longitudinally extending outer mounting members and extending between the side-by-side spool holding and retention cavities; and
the laterally extending and longitudinally spaced apart inner and outer rollers on each end of the side-by-side spool cavities attached to the center mounting member and the first and second longitudinally extending mounting members, wherein the centrifugal force retention shaft resides above the laterally extending inner and outer rollers.

6. The system of claim 2, further comprising a center member that separates the side-by-side spool holding and retention cavities and holds a first and second pair of laterally extending spool rods that attach to first and second longitudinally extending outermost mounting members, wherein the first pair of laterally extending spool rods hold the outer rollers and the second pair of laterally extending spool rods hold the inner rollers.

7. The system of claim 1, wherein the spool mount assemblies comprise a base with upper and lower plates that slidably engage the rotating table, wherein the upper plate comprises at least one pin that moves vertically between retracted and extended positions to releasably engage an aperture in the rotating table to lock into a desired radial location on the rotating table to thereby attach to the rotating table in alignment with a clipper without requiring attachment to a clipper at each respective clipper station.

8. The system of claim 1, wherein the first and second longitudinally extending outer mounting members each include an end segment that rises above a primary body segment and holds the centrifugal force retention shaft thereon.

9. The system of claim 1, wherein the centrifugal force retention shaft is fixedly attached to the first and second longitudinally extending outer mounting members, the centrifugal force retention shaft being sized and configured to remain in position while a spool is removed from or loaded in a respective spool holding and retention cavity.

10. The system of claim 1, wherein the centrifugal force retention shaft is pivotably attached to the first and second longitudinally extending outer mounting members.

11. The system of claim 1, wherein the centrifugal force retention shaft is releasably attached to the first and second longitudinally extending outer mounting members.

12. The system of claim 1, further comprising a plurality of clippers, one clipper residing in each respective clipper station and being aligned with a respective spool mount assembly, wherein each spool holding and retention cavity is configured to allow a spool of clips to be inserted into the spool holding and retention cavity while a corresponding proximate clipper remains in position.

13. The system of claim 1, wherein the rotating table comprises a plurality of pie-pan members that are spaced apart with radially extending gap spaces so that a narrow end of the pie-pan members reside proximate a center of the rotating table, and wherein the rotating table comprises cooperating plates with slots that reside along outer edges of the pie-pan members, and wherein the spool mount assemblies each comprise a base that slidably engages the slots of the cooperating plates and a handle that releases and engages a lock that allows an operator to radially slide and lock the respective spool mount assembly into a desired radial position on the rotating table.

\* \* \* \* \*